United States Patent [19]
Fraser

[11] Patent Number: 5,185,924
[45] Date of Patent: Feb. 16, 1993

[54] METHOD OF REPAIR OF TURBINES

[75] Inventor: Michael J. Fraser, Broughton Hackett, England

[73] Assignee: Turbine Blading Limited, Droitwich, United Kingdom

[21] Appl. No.: 711,818

[22] Filed: Jun. 7, 1991

[30] Foreign Application Priority Data

Jun. 12, 1990 [GB] United Kingdom ............... 9013081
Jul. 10, 1990 [GB] United Kingdom ............... 9015217

[51] Int. Cl.⁵ .............................................. B23P 15/04
[52] U.S. Cl. .................................. 29/889.1; 29/402.07; 29/402.13; 228/119
[58] Field of Search ............. 29/889.1, 402.07, 402.13; 228/119

[56] References Cited

U.S. PATENT DOCUMENTS 4,141,127  2/1979  Cretella et al. ............... 29/889.1
4,832,252  5/1989  Fraser ............................ 29/889.1

FOREIGN PATENT DOCUMENTS 0359585  3/1990  European Pat. Off. ........... 29/889.1
2091139  7/1982  United Kingdom ............... 29/889.1

Primary Examiner—Irene Cuda
Attorney, Agent, or Firm—Armstrong & Kubovcik

[57] ABSTRACT

A method of repairing stator blades in a turbine comprises the steps of making a pre-shaped insert of a material the same as or compatible with the material of the stator blade, the size of the insert is such that it forms a substantial part of the stator blade, the method including the step of removing a piece of material from the stator blade including the damaged part or part that it is required to modify and welding in the new insert. The insert is treated so that at least a part of it is hardened, the hardening may be diffusion alloying or plasma spray and the size of the insert is such that the weld line between the insert and the turbine blade is removed from the area of high wear making the insert larger than would apparently appear necessary, this enables substantial cut-outs to be made on each stator blade which in turn permits of much better access to the stator blades for securing the new insert and/or additional hardening steps such as plasma spray after the insert has been secured to the stator blade.

12 Claims, 1 Drawing Sheet

METHOD OF REPAIR OF TURBINES

BACKGROUND TO THE INVENTION

1. Field of the Invention

The present invention relates to a method of repair of turbines and parts thereof and is primarily concerned with the repair of stator blades sometimes known as nozzles or diaphragms, the purpose of which is to direct steam or gases onto the rotor blades.

In use of a turbine, stator blades situated at the high pressure end of the turbine are subject to wear caused primarily by particles carried by the steam, most of the wear occurring on the face which is directed towards the incoming steam. However, the reverse face of the stator blade is also subjected to wear due to the effect of steam or particles rebounding from the adjacent row of rotor blades onto the reverse face of the stator blades.

In the past where wear or damage of sufficient magnitude to impair the efficiency of a turbine had occurred, the stator blades were replaced which inevitably led to a very substantial expense.

It has been proposed to minimise such wear by providing on the trailing edges of the stator blades, the area most susceptible to damage, a Stellite insert. Due to the incompatibility of stellite with the parent material of the blade, usually a 12% chrome steel, a relatively soft weld material Inconel had to be used in order to ensure that the insert was properly secured to the stator blade and in view of the inclement conditions inside a turbine, the Inconel was subject to a much greater wear rate than the stator blade or of course the Stellite insert.

In parts of a turbine, e.g. the first set of blades of the high pressure stage or intermediate pressure stage, the stator blades are situated very close to each other making repair thereof extremely difficult. Whereas the worn trailing edge could in some cases be built up by several weld passes this meant all the new material put onto the blade was "cast" and in view of the number of passes needed the heat input to each stator blade was considerable which could lead to distortion which was subsequently very difficult, if not impossible to correct thus leading to uneven gaps between the stator blades and the chance of considerable inbuilt stress into the structure as a whole which again could lead to premature failure.

SUMMARY OF THE INVENTION

It is an object of the present invention to provide a method of repairing stator blades that overcomes or minimises the problems mentioned above.

According to one aspect of the present invention we provide a method of repairing stator blades comprising the steps of:

1. preparing a pre-shaped insert made from a material the same as or compatible with said stator blade, said insert affording at least a substantial part of the said stator blade;
2. treating said insert so that at least a part thereof has a surface that is harder than the material from which the insert is made;
3. removing a substantial part of said stator blade, the shape of the part removed being sufficient to accommodate said insert;
4. welding said insert to said stator blade with a weld material the same as or similar to the stator blade and/or insert material.

Preferably, said substantial part is large enough to ensure that any weld line extending substantially parallel to the trailing edge is sufficiently far from the trailing edge to be away from any area of high wear.

The insert for example may comprise 20% of the surface area of the blade and in some cases may be greater.

Preferably, the insert comprises a substantial part of the trailing edge of the stator blade. Alternatively the insert comprises a substantial part of the leading edge.

Preferably the method of repair may also include heat treatment processes to provide stress relief to the stator blade after repair thereof.

Since the material of the insert is the same as or compatible with the material of the turbine blade and preferably the securing of the insert to the blade may be made with a similar material and it is not necessary to use a soft or absorbent weld material which, even though such material may provide a satisfactory bond between the parts, because of its softness it is prone to erosion which may lead to the insert becoming detached from the remainder of the stator.

Whereas it is envisaged that the material of the insert may be the same as or very similar to the material of the blade, it is also envisaged that a harder material may be used which, even though harder, may still be compatible with the turbine blade in that it may be secured thereto using a weld material that is relatively hard.

Where a different material is used, such a material may be chosen for its enhanced wear characteristics or perhaps its suitability for hardening treatments such as diffusion alloying or plasma spray and it is envisaged that the insert may not only be treated before attachment to the remainder of the stator blade but further hardening and/or coating treatments may be carried out after it has been secured thereto. For example it is envisaged that an insert may be hardened by a diffusion alloying process and after securing to the remainder of the stator blade may be subjected to plasma spray to provide a further wear resistance coating.

If desired, the area of the weld may also be subjected to plasma spray to provide a capping to prevent wear of the weld material or alternatively a Stellite cap may be provided over the weld.

It is also envisaged that a plurality of coatings of plasma spray may be used to build up the repaired stator blade to a predetermined desired shape and a plurality of passes may be used so as to build up some areas more than others to produce the required shape of blade to prolong its life or efficiency or both.

It is envisaged that in some cases, the wear that has occurred to turbine stator blades may not in itself necessitate repair. However, the method of repair is equally applicable when it is desired to make slight alterations to the shape of the stator blades so as to improve efficiency.

During the manufacture of a stator array that is a diaphragm rather than a nozzle array, it is usual for the blades to be held in a mould and inner and outer rings are then formed by a casting process which sometimes disturbs the relative positions of the blades. The stator blades may then have different gaps between different blades and/or individual blades may be slightly misaligned.

The positioning and shape of a stator blade is highly critical to the performance of a turbine and even slight errors may lead to a considerable drop in efficiency and hence to a significantly increased fuel cost to generate a certain amount of electricity.

It is envisaged that the repair method of the present invention may be used so as to ensure that all the stator blades are correctly positioned relative to each other and each stator blade has the correct configuration and form so as to ensure maximum efficiency of at least that part of the turbine.

The positioning of the inserts which may form a substantial part of each stator blade may be facilitated by the use of guides locatable on a first stator blade to pre-set the position of an insert for an adjacent stator blade prior to welding of that insert to the remainder of the stator blade.

Since relative movement between the insert and the remainder of the stator blade may be expected to occur during welding, guides which are used to position the inserts but not to constrain their movement may intentionally position the insert in an out-of-alignment condition and, when welding has been completed, the outer position aligning of the insert may be compensated by the movement occurring between the insert and the remainder of the stator blade during welding.

The positioning of the joint away from the trailing edge of the blade and also away from any high wear area, not only moves the area of possible weakness, i.e. the weld, to an area far less likely to be prone to erosion during use of the turbine but also ensures that a large piece of the stator blade is removed, hence permitting easier access to an adjacent blade and treatment thereof by plasma deposition for example or during the welding process.

Since plasma deposition is a "line of sight" process, unless a substantial part of the insert is removed, then it would not be possible to carry out plasma deposition on much of the stator blade since access thereto would be restricted by adjacent stator blades, the removal of the substantial part enables such access and hence allows a stator blade to be built up using plasma deposition so that the final shape and form may be accurately controlled.

Whereas it is envisaged that each insert will be hardened prior to securing to the remainder of the stator blade, with the exception of an area along which welding is to take place, such treatment to produce a hardened surface or hardened area may be selected and, when a stator blade array to be repaired is inspected and the characteristics of the wear can be seen, it is envisaged that selective hardening of the inserts may take place so as to ensure that the areas that appear more prone to erosion are best treated in a manner to minimise further occurrence of such erosion and hence increase the life expectancy of the array.

It is also envisaged that after inspection of a worn array, changes may be made to the design of each blade as a whole by inserting an insert of different thickness, shape or configuration so as not only to increase efficiency of the turbine as a whole but also by modifying the shape to reduce erosion.

Since the inserts are treated prior to securing to the remainder of the array and it is envisaged that diffusion alloying may be a preferred form of treatment, such treatments require the insert to be elevated to very high temperatures which, if carried out on the array as a whole, could cause considerable damage to other parts of the array leading to inbuilt stress not capable of satisfactory stress relief and could disturb the whole assembly.

The treatment of the inserts in isolation with any masking necessary for weld areas ensures that a satisfactory hardening process can take place without any adverse effects to other parts of the array.

In some cases, it may be that damage has not only occurred to each stator blade but also to the inner and outer rings between which the blades are secured and the method of repair or modification of the present invention enables, after removal of a substantial part of each blade to be repaired or modified, access to the inner circumferential surface of the outer ring and the outer circumferential surface of the inner ring since access is permitted by removal of a substantial part of each blade, this enables repair to be carried out to such surfaces, for example by the build up of material by plasma deposition or by the insertion of a thin sheet of hard material which may be secured thereto in any suitable manner and, because of its hardness, provide satisfactory resistance to further erosion.

It is normal for stator blades, at least in steam turbines, to be made from a 12% chrome steel. However, the exact make up of this chrome steel may alter, depending upon whether they are nozzles or diaphragms and whether they are intended to be situated in the hight pressure section of the turbine, the intermediate pressure or the low pressure.

The method of the present invention envisages that blades in any section in a turbine may be made from a composite material and, for example, a diaphragm situated in the low pressure area may have an insert made from a material more usually used in a high pressure section of the turbine, the insert will be compatible with the material from which the remainder of the low pressure diaphragm is made but offering enhanced wear characteristics.

The hardening of said insert may comprise any suitable hardening process such as diffusion alloying, a plasma spray process, heat hardening or any other suitable process to ensure that at least the edge region of the blade insert has a hard and hence wear resistant surface.

Preferably at least the one side, e.g. the pressure side, of the blade is subjected to hardening by diffusion alloy and before or after securing of the insert to the remainder of the blade, the other side of the blade may be subjected to hardening by plasma spray and if required the said one side may also be subjected to a plasma spray process.

Preferably the substantial part of the blade that is removed is a larger part than would appear necessary to repair wear or damage caused to the blade which, even though it would appear unnecessary, gives significant and somewhat unexpected advantages:

1. the removal of a large part of each blade enables access to adjacent blades to allow the repair process to be carried out, which repair process would not have been possible without removal of a substantial part of each blade;

2. by ensuring that each insert comprises a substantial part of each blade, it is ensured that in normal circumstances a plurality of inserts of exactly the same size may be produced and which will be sufficiently large to ensure that all damaged parts of each blade are replaced by new material;

3. since the blade insert comprises the trailing edge region, which is a relatively thin part of the blade, by providing an insert of substantial size the material of the insert as it approaches the leading edge of the blade will be substantially thicker than the trailing edge thereby ensuring that the insert is joined to the remainder of the blade over at least the length thereof having a substantial thickness thereby making a much more secure joint;

4. the majority of the joint line between the insert and the blade will be well spaced from the trailing edge ensuring that any weakness afforded by the weld line is spaced well away from the area of maximum wear.

It is normal when such an insert is welded for movement of the insert or remainder of the blade to take place due to the application of considerable heat during the welding process.

Once the expected movement is known it is envisaged that the insert may be apparently misplaced before welding to the blade so that the movement that is expected to occur during welding will return the blade and/or insert to its intended position.

The shape and positioning of blades, particularly in steam turbines, is highly critical to their efficiency and the repair process of the present invention may be used to improve the shape of existing blades without necessitating their complete replacement and/or improve the accuracy of the positioning of each individual blade and the spacing between adjacent blades so as to further improve the efficiency of the turbine and may be carried out to turbine blades for the sake of improvement of efficiency even though individual blades may not be particularly worn or damaged.

The repair method of the present invention has a further advantage over and above replacement of the blades in that it considerably decreases the time necessary to fully repair a blade array, particularly since all the inserts being of identical shape may be pre-formed and hardened and since an identical piece is removed from each blade, this permits of some mechanisation or automisation of the process for removing a piece of each blade.

BRIEF DESCRIPTION OF THE DRAWINGS

The invention will now be described by way of example only with reference to the accompanying drawings, wherein.

DESCRIPTION OF THE PREFERRED EMBODIMENTS

Figure 1:
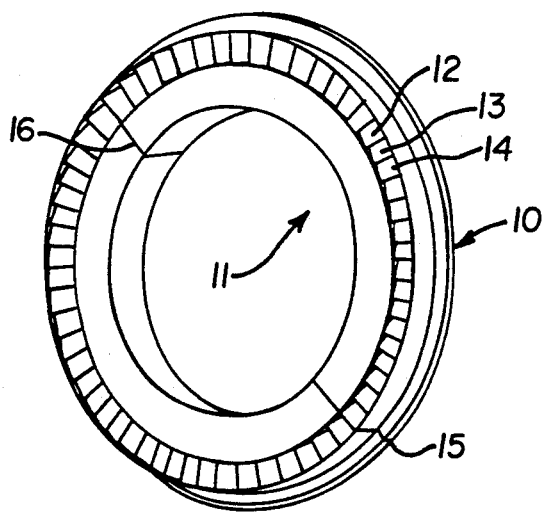
FIG. 1 is a view of a turbine stator blade array.

Referring first to FIG. 1 the stator blade array comprises an outer annular component 10, and an inner annular component 11 between which are secured a plurality of blades such as those shown at 12, 13 and 14.

The blade array shown in FIG. 1 shows the trailing edges of the blades which are those most prone to wear during use.

The blade arrays are normally formed in two halves and the array may be separated along the lines shown at 15 and 16.

Figure 2:
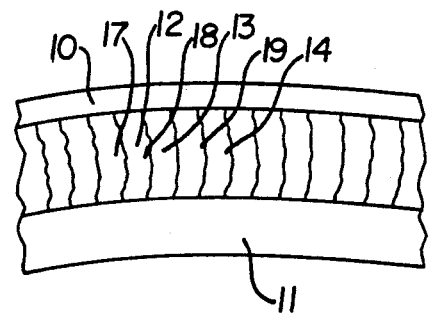
FIG. 2 is a view of part of the array shown in FIG. 1 showing damage to the turbine blades.

Referring now to FIG. 2, the trailing edges of the blades 12, 13, 14 to which wear and damage has taken place, as shown by damaged edges 17, 18 and 19.

Figure 4:
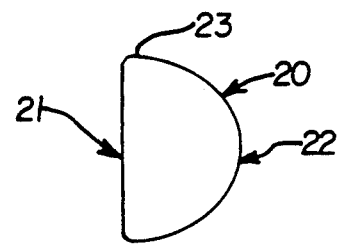
FIG. 4 illustrates an insert.

In order to carry out a repair, pre-formed inserts or coupons are formed, such as that shown in FIG. 4 and illustrated generally at 20. The coupon may be of any desired shape depending upon the dimensions and shape of blade to be repaired but typically is of a shape in which the insert forms a very substantial part if not all of the trailing edge region 21 and has a dimension transverse to the trailing edge 21 which comprises a substantial part of the stator blade, for example 20% and may in some cases approach 50% of the whole or even greater. Such a dimension ensures that the region as indicated by the arrow 22 is well spaced from the trailing edge region 21 which is usually more prone to damage and wear than the leading edge of the blade.

The insert 20 is formed from a material the same as or at least compatible with, i.e. similar hardness and similar material, the parent material of each stator blade and then is subjected to some suitable form of hardening process in which a substantial part if not all of the insert 20 has at least a hard surface area.

If desired an edge region on the semi-circular weld line 23 may be masked from such hardening process to ensure that the material along the weld line 23 is substantially unaffected by the hardening process.

Figure 3:
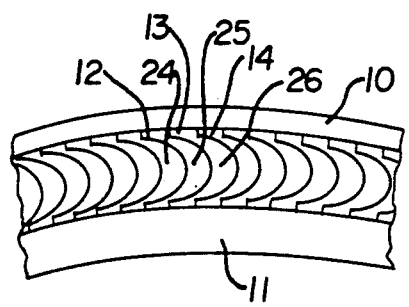
FIG. 3 is a view similar to FIG. 2 after removal of part of each blade.

Referring now in addition to FIG. 3, a piece of each blade is removed such as on blades 12, 13 and 14 to leave a cut-out 24, 25 and 26 of a shape to accommodate an insert such as that shown in FIG. 4.

Since the blade array as shown in FIG. 1 is formed in two halves, the array may be separated and an end stator blade is first machined to remove the cut-out such as that shown at 24, 25, 26 and then a cut-out may be made on each blade in turn, the cut-out made in the adjacent blade previously enabling access to the next to make the necessary cut-out.

Figure 5:
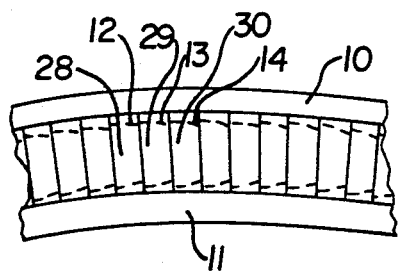
FIG. 5 is a view of the stator blades after the inserts have been welded thereto.

After the necessary pieces have been cut out from each blade, the insert such as that shown at 20 in FIG. 4 may be secured in place by welding and FIG. 5 illustrates the array in which a plurality of inserts such as that shown at 20 in FIG. 4 have been secured in place, such as the inserts 28, 29 and 30 on stator baldes 12, 13 and 14.

Whereas in the embodiment illustrated the inserts are of a shape to replace pieces of material of the same dimension it is envisaged that an insert may extend the boundaries of each stator blade and may be of a shape different from the original shape of the blade so as to improve efficiency of the turbine or improve other operating characteristics to enhance the working of the turbine as a whole or its life expectancy.

Figure 6:
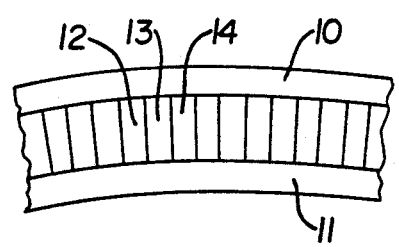
FIG. 6 is a view of the finished repaired stator blade array.

After welding of each insert to the blade, using a weld material that is similar to the material of the insert and/or blade which in all events are similar or compatible with each other, any work necessary on the weld filet may be carried out to return the stator blade array to its original form as shown in FIG. 6.

It is envisaged that the weld may be a penetration weld carried out from one side only of each blade, the cut-out in the adjacent blade permitting of sufficient access to the blade to carry out a satisfactory weld process. If the part of the blade that has been removed was not of sufficient size, such access would not be possible.

A further advantage gained in carrying out the weld from one side only in that the side where most weld will be visible may be selected to be that side which is less prone to wear during use of the turbine.

A heat treatment processes may be carried out for stress relief purposes during which the blades may be raised to predetermined temperatures for a predetermined length of time and maintained for a predetermined length of time at such temperatures after which they may be allowed to cool in a controlled manner.

Figure 7:
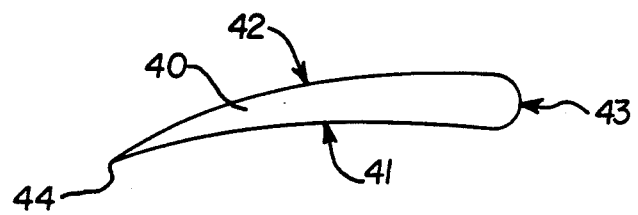
FIG. 7 is a section through a stator blade.

FIG. 7 is a section through a stator blade 40 which has a high pressure side 41, a low pressure side 42 and leading edge region 43, and a trailing edge region 44.

Since it is the high pressure side 41 that is most prone to erosion and damage, it is envisaged that at least the high pressure side 41 of a new insert will be subjected to diffusion alloying to produce a very hard surface finish and the side 42, the vacuum side or low pressure side may be subjected to a plasma spray process after the insert has been secured to the blade.

It is further envisaged that the high pressure side 41 in addition to the diffusion alloying may be subjected to a plasma spray process after securing to the blade.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A method of repairing stator blades of a turbine comprising the steps of:
   1. preparing a pre-shaped insert made from a material the same as or compatible with said stator blade, said insert affording at least 20 percent of the surface area of said stator blade;
   2. treating said insert so that at least the trailing edge portion thereof has a surface that is harder than the material from which the insert is made;
   3. removing at least 20 percent of said stator blade, the shape of the part removed being sufficient to accommodate said insert; and
   4. welding said insert to said stator blade with a weld material the same as or similar to the stator blade and/or insert material.

2. A method of repairing stator blades according to claim 1 wherein said insert affords at least 20 percent of the trailing edge of said stator blade.

3. A method of repairing a stator blade according to claim 1 wherein said insert affords at least 20 percent of the leading edge of said stator blade.

4. A method of repairing stator blades according to claim 1 wherein said method further comprises a heat treatment process to provide stress relief to the stator blade after repair thereof.

5. A method of repair according to claim 1 wherein at least a part of said insert is hardened by a diffusion alloying process.

6. A method of repair according to claim 1 wherein said insert, or at least a part thereof, is subjected to hardening by a plasma spray process.

7. A method of repair according to claim 1 wherein said stator blades comprise a nozzle, and said insert is subjected to a hardening process after securing to the remainder of the nozzle.

8. A method of repair according to claim 1 wherein said insert is subjected to a diffusion alloying process prior to securing to the remainder of the stator blade and is then subjected to a plasma spray hardening process after securing to the remainder of the stator blade.

9. A method of repair according to claim 1 wherein said insert is secured to the stator blade by welding and the area of the weld is subjected to plasma spray to provide a capping to prevent wear of the weld material.

10. A method of repair according to claim 1 wherein after securing said insert to said stator blade said insert and/or a part of said stator blade is subjected to a plurality of coatings of plasma spray to alter the shape of said stator blade.

11. A method of repair according to claim 1 wherein said method encompasses the change of shape of a stator blade from its original shape to an alternative shape irrespective of any damage to which the original stator blade had been subjected.

12. A method of repair according to claim 1 wherein said insert is located by guide means prior to securing to the remainder of the stator blade so as to secure the insert in its proper position.

* * * * *